United States Patent
Wang et al.

(10) Patent No.: US 11,390,183 B2
(45) Date of Patent: Jul. 19, 2022

(54) CHARGING SCHEDULING SYSTEMS AND METHODS THEREOF FOR CHARGING DEVICES

(71) Applicant: Noodoe Corporation, Taipei (TW)

(72) Inventors: John C. Wang, Taipei (TW);
Te-Chuan Liu, Taipei (TW);
Chun-Hung Kung, Taipei (TW)

(73) Assignee: NOODOE CORPORATION, Taipei (TW)

( * ) Notice: Subject to any disclaimer, the term of this patent is extended or adjusted under 35 U.S.C. 154(b) by 0 days.

(21) Appl. No.: 17/302,151

(22) Filed: Apr. 26, 2021

(65) Prior Publication Data
US 2022/0032811 A1    Feb. 3, 2022

(30) Foreign Application Priority Data
Jul. 31, 2020 (TW) .................................. 109126093

(51) Int. Cl.
*B60L 53/68* (2019.01)
*B60L 53/66* (2019.01)
*B60L 53/67* (2019.01)
*G06F 1/28* (2006.01)

(52) U.S. Cl.
CPC ............... *B60L 53/68* (2019.02); *B60L 53/66* (2019.02); *B60L 53/67* (2019.02); *G06F 1/28* (2013.01)

(58) Field of Classification Search
None
See application file for complete search history.

(56) References Cited

U.S. PATENT DOCUMENTS

| 2009/0094173 | A1* | 4/2009 | Smith | G06Q 50/06 705/412 |
| 2010/0174667 | A1* | 7/2010 | Vitale | B60L 53/18 705/412 |
| 2012/0161702 | A1* | 6/2012 | Kim | B60L 53/63 320/109 |
| 2017/0043674 | A1* | 2/2017 | DeBoer, III | B60L 53/64 |
| 2019/0092177 | A1* | 3/2019 | Malik | G06Q 50/30 |

* cited by examiner

*Primary Examiner* — Santosh R Poudel
(74) *Attorney, Agent, or Firm* — McClure, Qualey & Rodack, LLP (57) ABSTRACT

Charging scheduling systems and methods for charging devices applied to at least one charging device and a cloud management module are provided for charging an electric vehicle. First, a power status of a battery module of the electric vehicle is detected through a battery detection unit of the charging device, and electricity rate data corresponding to the charging device including the electricity price of corresponding power company at different times is then obtained by cloud management module. Next, through cloud management module, at least one charging period with a lower electricity price is determined based on electricity rate data corresponding to charging device and power status to control the charging of the electric vehicle by the charging device to be performed during the determined charging period.

9 Claims, 4 Drawing Sheets

CHARGING SCHEDULING SYSTEMS AND METHODS THEREOF FOR CHARGING DEVICES

BACKGROUND OF THE INVENTION

Field of the Invention

The disclosure relates generally to scheduling systems and methods thereof, and, more particularly to charging scheduling systems and methods for charging devices of electric vehicles.

Description of the Related Art

Recently, with the rising awareness of environmental protection and electric vehicle technology advances, the development of electric vehicles powered by electrical energy to replace traditional vehicles powered by fossil fuels has gradually become an important goal in the automotive field, thus making electric vehicles become more and more popular. In order to increase the range and willingness to use electric vehicles, many countries or cities have begun to set up charging stations in public places to provide electricity to electric vehicles, and have also begun to plan the deployment of a large number of charging stations in urban areas or scenic areas, so as to make the charging of electric vehicles more convenient.

On the other hand, with the increasing popularity of electric vehicles, many electric vehicle owners also choose home chargers to charge their electric vehicles at home. An electric vehicle owner may simply connect his/her electric vehicle to the home charger to start a charging process after returning home. Generally, once the electric vehicle is plugged into the home charger, the home charger will output power to charge the electric vehicle immediately. At that moment, it may be in the peak time of power consumption when the electricity price is relatively high. Therefore, the user may need to pay a high charging fee. Alternatively, the user may wait to connect the electric vehicle with the home charger for charging until a specific price discount period during which the electricity price is reduced. As the price discount period is usually set close to midnight, the user must spend much time and energy to wait until midnight for the price discount period to come and manually connect the electric vehicle to the home charger to start the charging process in the price discount period, causing inconvenience in use and reducing the willingness to use. On the other hand, if most electric vehicles are charging at the peak time or at specific time period, it will also increase the power consumption at the peak time or at the specific time period, thus causing the pressure of electricity use for people's livelihood.

BRIEF SUMMARY OF THE INVENTION

Charging scheduling systems and methods thereof for charging devices are provided, which can automatically determine charging periods with the lower electricity price according to an electricity rate data corresponding to the power company of the corresponding charging device and the power status of the electric vehicle and schedule and control the charging device to charge the electric vehicle during the charging periods, thus greatly reducing the charging costs, providing users with a good experience and improving the practicability of charging services, thereby reducing the cost of using electric vehicles and increasing the willingness to use the electric vehicles. Further, the charging schedule control can be provided to reduce the power consumption at the peak hours and disperse the time points of power consumption, thereby further effectively reducing the pressure of electricity use for people's livelihood.

An embodiment of a charging scheduling system for charging devices for charging an electric vehicle comprises a charging device and a cloud management module. The charging device comprises a battery detection unit, a network connection unit, and a processing unit. The battery detection unit detects a power status of a battery module of the electric vehicle. The processing unit is coupled to the battery detection unit and the network connection unit for transmitting the power status of the electric vehicle through a network by the network connection unit. The cloud management module comprises a storage unit, a network connection unit and a processor. The storage unit records electricity rate data of the charging device, wherein the electricity rate data comprises electricity prices with a TOU (Time Of Use) rate for a power company. The network connection unit receives the power status of the electric vehicle via the network. The processor is coupled to the storage unit and the network connection unit for determining at least one charging period with a lower electricity price according to the electricity rate data of the charging device and the power status, and scheduling and controlling the charging of the electric vehicle by the charging device to be performed during the determined at least one charging period.

In an embodiment of a charging scheduling method for charging devices applied to at least one charging device and a cloud management module for charging an electric vehicle, a power status of a battery module of the electric vehicle is detected through a battery detection unit of the charging device. Electricity rate data corresponding to the charging device is then obtained by the cloud management module, wherein the electricity rate data comprises electricity prices with a TOU (Time Of Use) rate for a power company. At least one charging period with a lower electricity price is determined based on the electricity rate data of the charging device and the power status, and the charging of the electric vehicle by the charging device is scheduled and controlled to be performed during the determined at least one charging period by the cloud management module.

In some embodiments, the processor calculates a charging time based on the power status and determines that the at least one charging period includes a first charging period and a second charging period based on the charging time, and wherein the processor schedules and controls the charging of the electric vehicle by the charging device, such that the charging device performs the charging of the electric vehicle in the first charging period and the second charging period, respectively.

In some embodiments, the processor receives a charged battery power status of the battery module of the electric vehicle via the network during the charging periods and stops the charging process when the charged battery power status of the battery module received in the first charging period or the second charging period during which the charging process is being performed on the electric vehicle has exceeded a predetermined threshold value.

In some embodiments, the processor detects whether the electricity rate data has an update and automatically stores the updated electricity rate data in the storage unit when the electricity rate data is updated.

In some embodiments, the power company comprises a first power company and a second power company, and the first power company corresponds to a first electricity rate data and the second power company corresponds to a second electricity rate data, wherein the processor detects whether the power company corresponding to the charging device is the first power company or the second power company, and respectively stores the first electricity rate data or the second electricity rate data as the electricity rate data based on the detection result.

In some embodiments, the processor compares the first electricity rate data and the second electricity rate data, dynamically adjusts a lower one between the first electricity rate data and the second electricity rate data to be the electricity rate data and sets the power company corresponding to the lower one between the first electricity rate data and the second electricity rate data as the power supply source for the charging process.

In some embodiments, the processor obtains a record of power use of the power company, and selects the time period during which the electricity rate is relatively low and the power use is not heavy to perform the charging process based on the record of power use of the power company and the electricity rate data.

In some embodiments, the electricity rate data comprises a lookup table having electricity price periods corresponding to the power company and respective electricity price for each electricity price period, and the at least one charging period is set as at least 2qone of price discount periods of the electricity price periods in the lookup table.

In some embodiments, the processor receives a power setting parameter and determines the power company corresponding to the charging device according to the power setting parameter.

Charging scheduling methods for charging devices may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
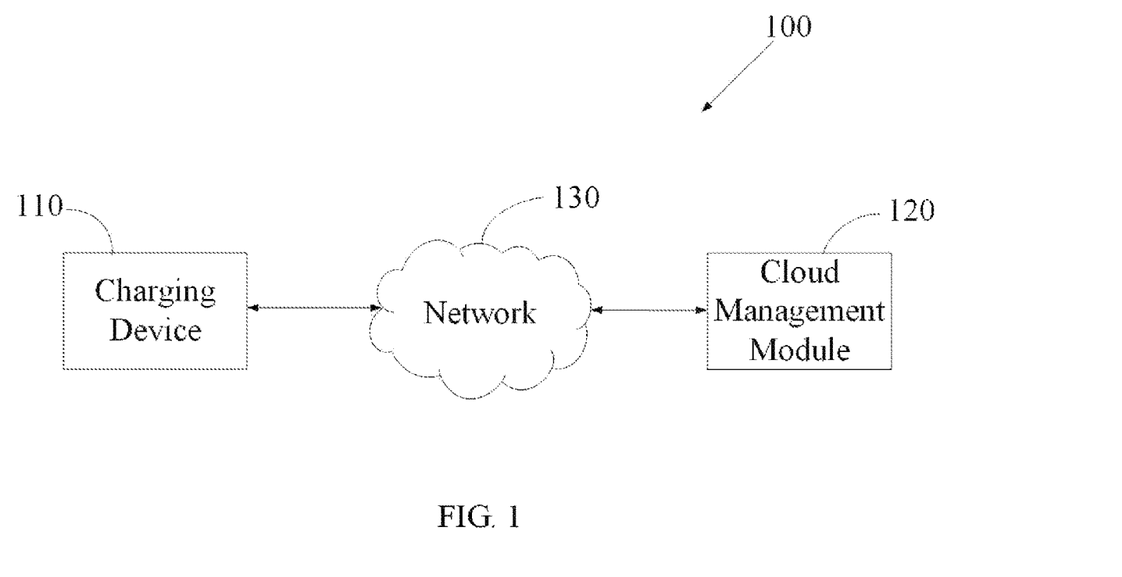
FIG. 1 is a schematic diagram illustrating an embodiment of a charging scheduling system for charging devices of the invention.

FIG. 1 is a schematic diagram illustrating an embodiment of a charging scheduling system for charging devices of the invention. As shown in FIG. 1, the charging scheduling system 100 of the present invention comprises a charging device 110 and a cloud management module 120. In some embodiments, the charging device 110 can be coupled to the cloud management module 120 via a network 130 such as a wired network, a telecommunication network, and a wireless network, such as a Wi-Fi network or the like. The charging device 110 can output power for charging at least one electric vehicle (for example, an electric scooter or an electric car). In one embodiment, the charging device 110 may be utilized for charging an electric vehicle. In another embodiment, the charging device 110 may be utilized for charging two or more electric vehicles. In some embodiments, the charging device 110 may be a home charger, and the invention is not limited thereto.

The user can connect an electric vehicle to the charging device 110 to transmit a charging request corresponding to the charging device 110, so as to use the charging device 110 to charge the electric vehicle. In some embodiments, the charging request may be transmitted from a user device (not shown) of a user for the electric vehicle to the cloud management module 120 via the network 130. The user device can be any electronic device with an Internet capability, such as a mobile device, such as a mobile phone, a smartphone, a personal digital assistant, a global positioning system, a notebook and so on. In some embodiments, a user of an electric vehicle may use his/her user device to download an application from the cloud management module 120 and install it to generate the charging request through a user interface of this application. In some embodiments, the user can scan a Quick Response Code (QR code) on the charging device 110 by the scanning function of the application to generate the charging request, thereby activating a charging process.

The cloud management module 120 may generate an instruction and transmit it to the charging device 110 via the network 130, so as to schedule and control the charging device 110 to output power to an electric vehicle which is electronically connected to the charging device 110 or prohibit the charging device 110 from outputting power to the electric vehicle in specific time periods.

Figure 2:
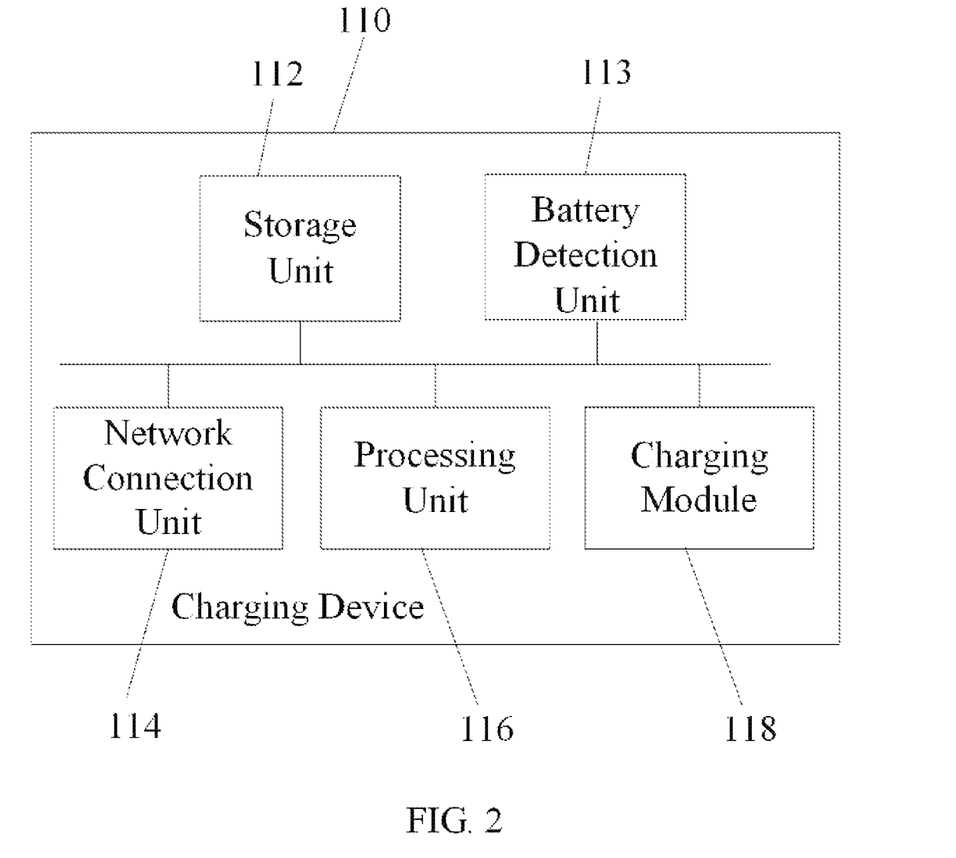
FIG. 2 is a schematic diagram illustrating an embodiment of a charging device of the invention.

FIG. 2 is a schematic diagram illustrating an embodiment of a charging device of the invention. As shown in FIG. 2, the charging device can be applied to the charging device 110, which has processing and computing capabilities to perform charging management operations belonging to the charging device, and has a network connection function to receive, download or update various parameters and information required for charging management calculations.

The charging device 110 at least comprises a storage unit 112, a battery detection unit 113, a network connection unit 114, a processing unit 116, and a charging module 118. The storage unit 112 (for example, a memory) can store and record related data, such as charging device information, charging request information included in the charging device and so on. It is noted that, the above examples are only examples of the present invention, and the invention is not limited thereto. The network connection unit 114 is configured to receive, download, or update various parameters and information required for charging management operations through a network, such as a wired network, a telecommunications network, and a wireless network, such as a Wi-Fi network, and so on. In some embodiments, the battery detection unit 113 may have detection circuits or other power detection software and hardware components to perform power level detection on a specific battery module, such as a battery module of an electric vehicle, to generate power detection data including the power status corresponding thereto. For example, when the electric vehicle is connected to the charging device 110, the battery detection unit 113 can detect the power level of the battery module of the electric vehicle, so as to obtain the power status corresponding to the battery module from the electric vehicle, and generate the generate power detection data including the power status of the battery module. The processing unit 116 can control related operations of software and hardware in the charging device 110 to perform the charging scheduling method for charging devices of the invention, which will be described later. For example, the processing unit 116 can be a general-purpose controller, a micro-control unit (MCU), a digital signal processor (DSP), or the like, which provides the function of data analyzing, processing and computing. However, it is understood that the present invention is not limited thereto.

In one embodiment, the processing unit 116 can use the network connection unit 114 to transmit the power status of the corresponding electric vehicle via a network for a cloud management module such as the cloud management module 120 to perform subsequent charging schedules. In another embodiment, the processing unit 116 can obtain the electricity rate data of the corresponding charging devices 110 through the cloud management module, and determine at least one charging period with a lower electricity price according to the electricity rate data of the charging device 110 and the power status, and schedule and control the charging of the electric vehicle by the charging device to be performed during the determined at least one charging period. The electricity rate data comprises electricity prices with a TOU (Time Of Use) rate for a power company, that has multiple electricity price periods and electricity rates corresponding thereto, such as peak electricity price period and off-peak electricity price period or peak electricity price period, mid-peak electricity price period and off-peak electricity price period, and the invention is not limited thereto. The electricity price set for the peak electricity price period is the highest, followed by the mid-peak electricity price period, and the off-peak electricity price period is the lowest. In some embodiments, the electricity rate data may include a lookup table having electricity price periods corresponding to a specific power company and respective electricity price for each electricity price period. In one embodiment, the lookup table may include non-discount periods and one or more price discount periods with relatively low electricity prices and their electricity price information. Generally speaking, the electricity rate data may include relevant information of pricing methods and electricity pricing structures set by specific power companies, and different power companies may have different pricing methods and electricity pricing structures. Each power company have a corresponding electricity rate data, which can be used to obtain its pricing method and electricity price structure. The charging module 118 may include one or more charging connectors (such as charging cables) that meet the same charging interface specification or meet different charging interface specifications, which are electrically connected to the corresponding electric vehicle, and output power to the electric vehicle according to the instructions from the processing unit 116.

Figure 3:
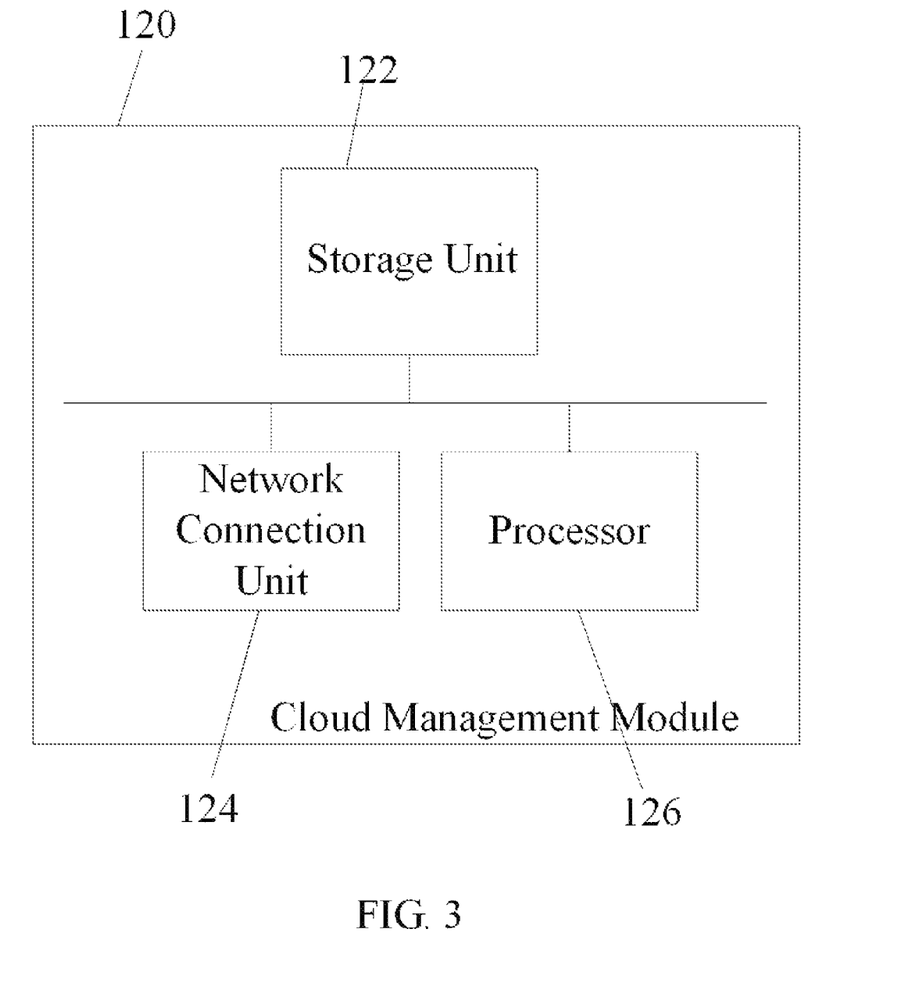
FIG. 3 is a schematic diagram illustrating an embodiment of a cloud management module of the invention.

FIG. 3 is a schematic diagram illustrating an embodiment of a cloud management module of the invention. As shown in FIG. 3, the cloud management module 120 of the invention can be any processor-based electronic device, which comprises at least a storage unit 122, a network connection unit 124, and a processor 126. In one embodiment, the cloud management module 120 may be a charging management server, but the invention is not limited thereto. It should be noted that, the cloud management module 120 can receive various data to perform charging management operations corresponding to a charging device 110. The network connection unit 124 can receive the coupling of different charging devices via a network 130, such as a wired network, a telecommunication network, and a wireless network, such as a network, and can transmit related data to different charging devices via the network 130, thus to control each charging device to or not to output power to charge an electric vehicle.

The storage unit 122 (for example, a memory) can store and record related data, such as an electricity rate data of the charging device 110, various data of the charging device 110, and so on. The electricity rate data comprises electricity prices with a TOU (Time Of Use) rate for a power company, that has multiple electricity price periods and electricity rates corresponding thereto, such as peak electricity price period and off-peak electricity price period or peak electricity price period, mid-peak electricity price period and off-peak electricity price period, and the invention is not limited thereto. The electricity price set for the peak electricity price period is the highest, followed by the mid-peak electricity price period, and the off-peak electricity price period is the lowest. In some embodiments, the electricity rate data may include a lookup table having electricity price periods corresponding to a specific power company and respective electricity price for each electricity price period. In one embodiment, the lookup table may include non-discount periods and one or more price discount periods with relatively low electricity prices and their electricity price information. Generally speaking, the electricity rate data may include relevant information of pricing methods and electricity pricing structures set by specific power companies, and different power companies may have different pricing methods and electricity pricing structures. Each power company have a corresponding electricity rate data, which can be used to obtain its pricing method and electricity price structure.

The cloud management module 120 can be coupled to the charging device 110 and communicate with each other via the network 130 by using the network connection unit 122. The processor 126 can control related operations of software and hardware in the cloud management module 120 to perform the charging scheduling method for charging devices of the invention, which will be described later. For example, the processor 126 can be a general-purpose controller, a micro-control unit (MCU), a digital signal processor (DSP), or the like, which provides the function of data analyzing, processing and computing. However, it is understood that the present invention is not limited thereto.

It should be understood that each of the elements, units or modules in the present embodiments may be a device having a corresponding function, which can have the appropriate hardware circuits or elements to perform the corresponding function, however, the device is not limited to be entity device, which can also be a virtual device having program and software with respective functions or a device having capabilities for processing and running the program and software. The manner of operations of the respective elements can further refer to the following description of the methods.

In some embodiments, the processor 126 may receive power setting parameters of the power company, such as the power usage area code (zip code) and/or the identification information of the power company, etc., and determine the power company of the corresponding charging device according to the power setting parameters. That is, the user can provide the above power setting parameters in advance through a user interface or their user device, and the processor 126 can automatically determine which power company corresponding to the charging device based on the power setting parameters provided, and can automatically obtain the electricity rate data of this power company and store it in the storage unit 122 as the electricity rate data of the corresponding charging device.

In some embodiments, the processor 126 may further detect an update status of the electricity rate data and automatically store the updated electricity rate data in the storage unit when the electricity rate data has been updated. In other words, the processor 126 can continuously detect whether the electricity rate data of the power company of the corresponding charging device is updated, and automatically store the updated electricity rate data in the storage unit 122 when there has an update, so it can keep the latest and correct electricity rate data for subsequent determination.

In some embodiments, the power company may include a first power company and a second power company, and the first power company corresponds to a first electricity rate data and the second power company corresponds to a second electricity rate data. The processor 126 may detect that the power company of the corresponding charging device is the first power company or the second power company, and correspondingly store the first electricity rate data or the second electricity rate as the electricity rate data of the corresponding charging device based on the detection result. Therefore, according to this embodiment, when there are power supply areas where multiple power companies can select, the cloud management module can automatically replace the electricity rate data corresponding to the currently selected power company. For example, the first electricity rate data is used as the electricity rate data of the corresponding charging device when it is detected that the power company of the corresponding charging device is the first power company, the second electricity rate data is used as the electricity rate data of the corresponding charging device when it is detected that the power company of the corresponding charging device is the second power company, and so forth.

Figure 4:
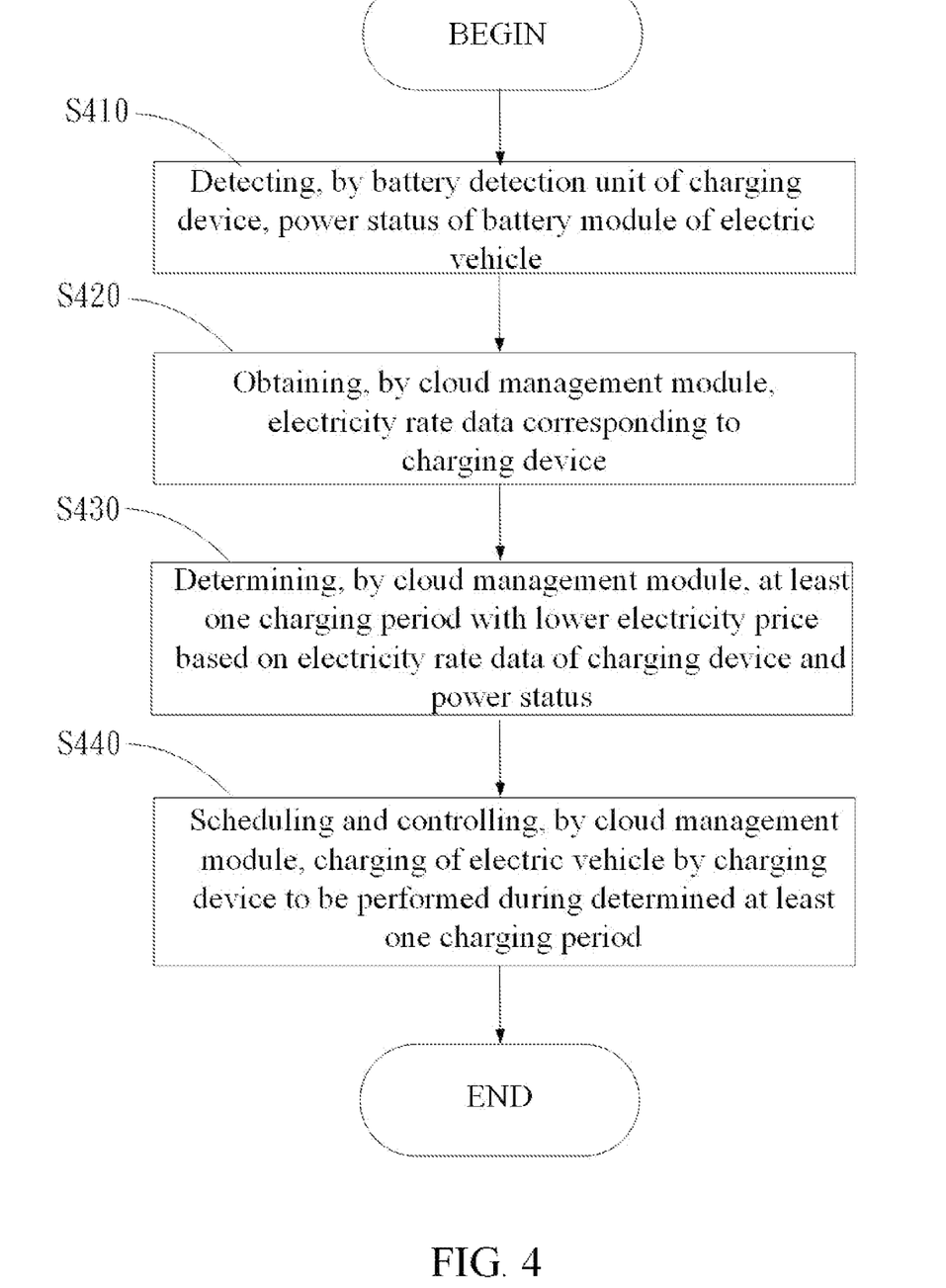
FIG. 4 is a flowchart of an embodiment of a charging scheduling method for charging devices of the invention.

FIG. 4 is a flowchart of an embodiment of a charging scheduling method for charging devices of the invention. The charging scheduling method for charging devices of the invention can be applied to at least one charging device and a cloud management module, such as the charging device 110 and the cloud management module 120 as shown in FIGS. 1, 2 and 3 and performed by the processor 126 of the cloud management module 120 for performing a charging process on an electric vehicle. The cloud management module 120 can be coupled to the charging device 110 via a network 130, such as a wired network, a telecommunication network, and a wireless network, such as a Wi-Fi network. In one embodiment, the cloud management module 120 may be a charging management server, but the invention is not limited thereto.

First, in step S410, a power status of a battery module of the electric vehicle is detected by a battery detection unit of the charging device. In some embodiments, the battery detection unit may have detection circuits or other power detection software and hardware components to perform power level detection on a specific battery module, such as a battery module of an electric vehicle, to generate power detection data including the power status corresponding thereto. For example, when the electric vehicle is connected to the charging device, the battery detection unit can detect the power level of the battery module of the electric vehicle, so as to obtain the power status corresponding to the battery module from the electric vehicle, and generate the generate power detection data including the power status of the battery module.

Then, in step S420, electricity rate data corresponding to the charging device is obtained by the cloud management module, wherein the electricity rate data comprises electricity prices with a TOU (Time Of Use) rate for a power company, that has multiple electricity price periods and electricity rates corresponding thereto, such as peak electricity price period and off-peak electricity price period or peak electricity price period, mid-peak electricity price period and off-peak electricity price period, and the invention is not limited thereto. The electricity price set for the peak electricity price period is the highest, followed by the mid-peak electricity price period, and the off-peak electricity price period is the lowest. In some embodiments, the electricity rate data may include a lookup table having electricity price periods corresponding to a specific power company and respective electricity price for each electricity price period. In one embodiment, the lookup table may include non-discount periods and one or more price discount periods with relatively low electricity prices and their electricity price information. Generally speaking, the electricity rate data may include relevant information of pricing methods and electricity pricing structures set by specific power companies, and different power companies may have different pricing methods and electricity pricing structures. Each power company have a corresponding electricity rate data, which can be used to obtain its pricing method and electricity price structure. In some embodiments, the processor of the cloud management module may receive power setting parameters of the power company, such as the power usage area code (zip code) and/or the identification information of the power company, etc., and determine the power company of the corresponding charging device according to the power setting parameters. That is, the user can provide the above power setting parameters in advance through a user interface or their user device, and the processor can automatically determine which power company corresponds to the charging device based on the power setting parameters provided, and can automatically obtain the electricity rate data of the power company and store it in the storage unit as the electricity rate data of the corresponding charging device.

In some embodiments, the processor may further detect an update status of the electricity rate data and automatically store the updated electricity rate data in the storage unit when the electricity rate data has been updated. In other words, the processor can continuously detect whether the electricity rate data of the power company of the corresponding charging device is updated, and automatically store the updated electricity rate data in the storage unit when there has an update, so it can keep the latest and correct electricity rate data for subsequent determination.

In some embodiments, the power company may include a first power company and a second power company, and the first power company corresponds to a first electricity rate data and the second power company corresponds to a second electricity rate data. The processor may detect that the power company of the corresponding charging device is the first power company or the second power company, and correspondingly store the first electricity rate data or the second electricity rate as the electricity rate data of the corresponding charging device based on the detection result. Therefore, according to this embodiment, when there are power supply areas where multiple power companies can select, the cloud management module can automatically replace the electricity rate data corresponding to the currently selected power company. For example, the first electricity rate data is used as the electricity rate data of the corresponding charging device when it is detected that the power company of the corresponding charging device is the first power company, the second electricity rate data is used as the electricity rate data of the corresponding charging device when it is detected that the power company of the corresponding charging device is the second power company, and so forth.

In another embodiment, the cloud management module may automatically compare the electricity rate data of each power company and select a power company with a relatively favorable electricity price as the power supply source for the charging process. Meanwhile, the processor automatically compares the first electricity rate data and the second electricity rate data, dynamically adjusts a lower one between the first electricity rate data and the second electricity rate data to be the electricity rate data and sets the power company corresponding to the lower one between the first electricity rate data and the second electricity rate data as the power supply source for the charging process. For example, the electricity rate data is first set as the first electricity rate data when the original power supply source is the first power company. When the second electricity rate data is the lower one of the two electricity rate data, the power supply source can be dynamically adjusted to the second power company, and the electricity rate data for reference is changed to the second electricity rate data.

After obtaining the electricity rate data of the corresponding charging device, in step S430, at least one charging period with a lower electricity price is determined by the cloud management module based on the electricity rate data of the charging device and the power status, and then in step S440, the charging of the electric vehicle by the charging device is scheduled and controlled to be performed during the determined at least one charging period by the cloud management module, so that the charging device starts a charging process for the electric vehicle during the at least one determined charging period.

In some embodiments, when determining at least one charging period with a lower electricity price in step S430, the processor calculates a charging time based on the power status of the battery module of the electric vehicle and determines that the at least one charging period includes a first charging period and a second charging period based on the charging time. The processor schedules and controls the charging of the electric vehicle by the charging device, such that the charging device performs the charging process on the electric vehicle in the first charging period and the second charging period, respectively. That is, the processor can estimate the remaining power of the battery module according to the capacity data of the battery module and the power status of the battery module. Then, the charging time required for the battery module to be fully charged is calculated according to the relevant performance information of the charging device, such as charging efficiency and output power. When the charging time calculated is larger than the time length of the first charging period, for example, the charging time calculated is 3 hours while the time length of the first charging period (for example, the price discount period with the largest electricity price discount) is only 2 hours, the charging will be stopped after the completion of the 2-hour charging process in the first charging period. The performance of the charging process will be postponed to the second charging period (such as the price discount period with the second largest electricity price discount), and the charging process will be continued and performed for the remaining one hour during the second charging period.

In some embodiments, the processor receives a charged battery power status of the battery module of the electric vehicle via the network during the charging periods and stops the charging process when the charged battery power status of the battery module received in the first charging period or the second charging period during which the charging process is being performed on the electric vehicle has exceeded a predetermined threshold value. In this embodiment, the user of the electric vehicle may set a predetermined threshold value, such as the percentage of target power level to be charged, and the processor can instantly receive the charged power status of the battery module of the electric vehicle detected by the battery detection unit of the charging device through the network, and the charging process will be automatically ended when the charged power status of the battery module has exceeded the predetermined threshold value, so that the user can freely determine the target charging power, thus providing users with more flexible charging services. For example, when the calculated charging time is 3 hours, while the time length of the first charging period is only 2 hours and the predetermined threshold value is set as 80% of the total battery power, the processor starts a first stage of the charging process at the first charging period and detects and determines whether the battery power after charging has exceeded 80% of the total battery power. When it is determined that the charged battery power has exceeded 80% of the total battery power in the first charging period, that is, the predetermined battery power target has been reached, the charging process is ended and thus a second stage of the charging process will not be performed. When the first stage of the charging process is completed and it is determined that the charged battery power has not exceeded 80% of the total battery power, it means that the predetermined battery power target has not been reached yet, and thus the second stage of the charging process is required. Therefore, the processor first instructs the charging device to stop charging and then delays the charging process to the second charging period before performing the second stage of the remaining charging process. The processor will start performing the second stage of the charging process in the second charging period and detects and determines whether the battery power after charging has exceeded 80% of the total battery power. When it is determined that the charged battery power has exceeded 80% of the total battery power in the second charging period, it means that the predetermined battery power target has been reached, and thus the charging process is ended.

In some embodiments. the processor may further obtain a record of power use of the corresponding power company and select the time period during which the electricity rate is relatively low and the power use is not heavy (also referred to as the off-peak period of power use) to perform the charging process based on the record of power use of the corresponding power company and the electricity rate data.

In another embodiment, the determination of the charging period and the charging schedule control of the aforementioned steps S430 and S440 can be performed by the processing unit of the charging device. That is, the processing unit can, after obtaining the electricity rate data of the corresponding charging device through the cloud management module, determine at least one charging period with a lower electricity price based on the electricity rate data and power status of the corresponding charging device, and schedule and control. the charging of the electric vehicle by the charging device, so that the charging device performs the charging process on the electric vehicle during the determined at least one charging period.

For example, in one embodiment, a user can set the power setting parameters of the power company, such as the power usage area code (zip code) and/or the name of the power company, etc., in his/her area through a user interface in advance. The cloud management module can receive this power setting parameter through the network and determines the corresponding power company of the charging device as a Power Company A according to the power setting parameters, and it can automatically obtain the electricity rate data A1 of the Power Company A as a reference for the electricity rate. When the user returns home at a peak time period of power use (that is, the power use is heavy during the peak time period) and connects the charging connector of the charging device to the electric vehicle, since it is in a period of higher electricity prices at this moment, the cloud management module determines that one or more price discount periods with lower electricity price are charging periods according to the electricity rate data A1 and the charging device will not start charging the electric vehicle immediately. In other words, the electric vehicle will not be charged. When the determined price discount period has reached, the cloud management module controls the charging device to start charging the electric vehicle during the scheduled price determined period until the charging process is completed (that is, the battery power after charging reaches the target battery power). Meanwhile, when the Power Company A updates its electricity rate data from the electricity rate data A1 to an electricity rate data A2, the cloud management module can automatically detect and update the electricity rate data A2 as the reference for the electricity rate. Further, when the power company of the charging device is changed from the Power Company A to a Power Company B, the cloud management module can automatically detect and update a corresponding electricity rate data B1 of the Power Company B as the reference for the electricity rate. Thus, users can also fully charge the battery of the electric vehicle and go out in the morning with fully-charged battery, and only need to pay a cheaper charging fee, thereby greatly reducing the charging fee and provide users with good use experience.

Therefore, the charging scheduling systems and methods thereof for charging devices of the present invention can automatically determine charging periods with the lower electricity price according to the electricity rate data corresponding to the power company of the corresponding charging device and the power status of the electric vehicle and schedule and control the charging device to charge the electric vehicle during the charging periods, which allows the user to simply connect the charging connector of the charging device to the electric vehicle after returning home and the charging scheduling system can automatically schedule according to his usage needs to help him find one or more cheap time period for charging, thus greatly reducing the charging costs, providing users with good experience and improving the practicability of charging services, thereby reducing the cost of using electric vehicles and increasing the willingness to use the electric vehicles. Further, embodiments of the invention can also provide the charging schedule control to reduce the power consumption at the peak hours and disperse the time points of power consumption, thereby further effectively reducing the pressure of electricity use for people's livelihood.

Charging scheduling methods for charging devices, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A charging scheduling system for charging devices for a charging process of an electric vehicle, comprising:
   a charging device, comprising:
      a battery detection circuit detecting a power status of a battery circuit of the electric vehicle;
      a network connection circuit; and
      a processing circuit coupled to the battery detection circuit and the network connection circuit, transmitting the power status of the electric vehicle through a network by the network connection circuit; and
   a cloud management circuit, comprising:
      a storage circuit recording electricity rate data of the charging device, wherein the electricity rate data comprises electricity prices with a TOU (Time Of Use) rate for a power company;
      a network connection circuit receiving the power status of the electric vehicle via the network; and
      a processor coupled to the storage circuit and the network connection circuit, determining at least one charging period with a lower electricity price according to the electricity rate data of the charging device and the power status, and scheduling and controlling the charging of the electric vehicle by the charging device to be performed during the determined at least one charging period,
   wherein the power company comprises a first power company and a second power company, and the first power company corresponds to a first electricity rate data and the second power company corresponds to a second electricity rate data, the processor further detects whether the power company currently supplying power to the charging device is the first power company or the second power company, and respectively stores the first electricity rate data or the second electricity rate data as the electricity rate data based on the detection result, in the storage circuit.

2. The charging scheduling system of claim 1, wherein the processor further calculates a charging time based on the power status and determines the at least one charging period including a first charging period and a second charging period based on the charging time, and the processor further schedules and controls the charging of the electric vehicle by the charging device, such that the charging device performs the charging of the electric vehicle in the first charging period and the second charging period, respectively.

3. The charging scheduling system of claim 2, wherein the processor further receives a charged battery power status of the battery circuit of the electric vehicle via the network during the charging periods and stops the charging process when the charged battery power status of the battery circuit received in the first charging period or the second charging period during which the charging process is being performed on the electric vehicle has exceeded a predetermined threshold value.

4. The charging scheduling system of claim 1, wherein the processor further detects whether the electricity rate data has a update and automatically stores the updated electricity rate data in the storage circuit when the electricity rate data is updated.

5. The charging scheduling system of claim 1, wherein the processor further compares the first electricity rate data and the second electricity rate data, dynamically adjusts a lower one between the first electricity rate data and the second electricity rate data to be the electricity rate data and sets the power company corresponding to the lower one between the first electricity rate data and the second electricity rate data as the power supply source for the charging process.

6. The charging scheduling system of claim 1, wherein the processor further obtains a record of power use of the power company, and selects the time period during which the electricity rate is relatively low and the power use is not heavy to perform the charging process based on the record of power use of the power company and the electricity rate data.

7. The charging scheduling system of claim 1, wherein the electricity rate data comprises a lookup table having electricity price periods and respective electricity price for each electricity price period corresponding to the power company, and the at least one charging period is set as at least one of price discount periods of the electricity price periods in the lookup table.

8. The charging scheduling system of claim 1, wherein the processor further receives a power setting parameter and determines the power company corresponding to the charging device according to the power setting parameter.

9. A charging scheduling method for charging devices applied to at least one charging device and a cloud management circuit for charging an electric vehicle, comprising:
   detecting a power status of a battery circuit of the electric vehicle through a battery detection circuit of the charging device;
   obtaining electricity rate data corresponding to the charging device by the cloud management circuit, wherein the electricity rate data comprises electricity prices with a TOU (Time Of Use) rate for a power company; and
   determining at least one charging period with a lower electricity price based on the electricity rate data of the charging device and the power status, and scheduling and controlling the charging of the electric vehicle by the charging device to be performed during the determined at least one charging period, by the cloud management circuit,
   wherein the power company comprises a first power company and a second power company, and the first power company corresponds to a first electricity rate data and the second power company corresponds to a second electricity rate data, the method further comprising detecting, by the cloud management circuit, whether the power company currently supplying power to the charging device is the first power company or the second power company, and respectively storing the first electricity rate data or the second electricity rate data as the electricity rate data based on the detection result.

* * * * *